US010055847B2

(12) United States Patent
Johansson

(10) Patent No.: US 10,055,847 B2
(45) Date of Patent: Aug. 21, 2018

(54) METHOD FOR INCREASING RELIABILITY IN MONITORING SYSTEMS

(71) Applicant: Axis AB, Lund (SE)

(72) Inventor: Emanuel Johansson, Lund (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 15/374,270

(22) Filed: Dec. 9, 2016

(65) Prior Publication Data
US 2017/0169560 A1  Jun. 15, 2017

(30) Foreign Application Priority Data
Dec. 11, 2015 (EP) ................................. 15199524

(51) Int. Cl.
*G06T 7/00* (2017.01)
*G06T 7/20* (2017.01)
*G06K 9/00* (2006.01)

(52) U.S. Cl.
CPC .......... *G06T 7/004* (2013.01); *G06K 9/00771* (2013.01); *G06T 7/20* (2013.01)

(58) Field of Classification Search
None
See application file for complete search history.

(56) References Cited

U.S. PATENT DOCUMENTS 6,816,184 B1 * 11/2004 Brill .................. G06K 9/00771
348/143
8,767,070 B2 * 7/2014 Busch ................ G06K 9/00771
348/141
2006/0152584 A1 * 7/2006 Wang .................... G06T 7/33
348/143

(Continued)

FOREIGN PATENT DOCUMENTS

| CN | 101123721 A | 2/2008 |
| CN | 101889288 A | 11/2010 |
| CN | 103456024 A | 12/2013 |

(Continued)

OTHER PUBLICATIONS

Yun Zhai et al., "Virtual Boundary Crossing Detection without Explicit Object Tracking", Advanced Video and Signal Based Surveillance, 2009, AVSS '09, Sixth IEEE International Conference on, IEEE, Piscataway, NJ, USA, Sep. 2, 2009; XP031542375.

(Continued)

*Primary Examiner* — Delomia L Gilliard
(74) *Attorney, Agent, or Firm* — Volpe and Koenig, P.C.

(57) ABSTRACT

A method for detecting an object crossing event at a predetermined first line in a scene captured by a motion video camera is disclosed. The method comprises determining from images of the scene captured by the motion video camera if an object image crosses the predetermined first line, calculating a size value relating to the size of the object image crossing the predetermined first line, setting a line distance value to a value calculated from the distance between a contact point of the object with the predetermined first line and a nearby point on a predetermined second line, and generating an object crossing event signal if a relation between the calculated size value and the line distance is within a predetermined range.

11 Claims, 5 Drawing Sheets

(56) References Cited

U.S. PATENT DOCUMENTS

2011/0033087 A1    2/2011  Finn et al.
2015/0043777 A1*  2/2015  Tsai .................. G06K 9/00771
                                                        382/103

FOREIGN PATENT DOCUMENTS

| CN | 104349136 A | | 2/2015 | |
|---|---|---|---|---|
| DE | 10 2007 058 959 A1 | | 6/2009 | |
| EP | 1871105 A1 | * | 12/2007 | ....... G06F 17/30817 |
| EP | 2 607 952 A1 | | 6/2013 | |
| EP | 2607952 A1 | * | 6/2013 | ............... G03B 5/00 |
| GB | 2 484 668 A | | 4/2012 | |
| GB | 2484668 A | * | 4/2012 | ........... G08B 13/196 |
| WO | 2009126151 A1 | | 10/2009 | |

OTHER PUBLICATIONS

Hao Long et al., "Fuzzy Judgment Algorithm based on security alarm system in the video surveillance", Computer Science and Network Technology (ICCSNT), 2012 2nd International Conference on, IEEE, Dec. 29, 2012; XP032420152.
EP 15 19 9524.8 European Search Report (dated May 24, 2016).
CN 201611089640.X Office Action dated Feb. 27, 2018.

* cited by examiner

METHOD FOR INCREASING RELIABILITY IN MONITORING SYSTEMS

FIELD OF INVENTION

A method for analyzing motion video and detecting objects crossing a predetermined line is disclosed.

BACKGROUND

One common task in surveillance is to determine if someone or something crosses a predetermined boundary or line, e.g. a fence. This type of surveillance is a tedious task if performed manually and therefore various automatic systems has been suggested over the years. Different types of tripwires have been used, from real physical wires to beams of light. In later years the tripwires have entered the logic realm as well. In this incarnation it is implemented in software analysing motion video captured by a camera. Such logic tripwires is generally defining one or a plurality of lines in the captured scene and then the motion video is analysed for identifying objects moving in the video and if an identified object breaks a defined line an event is generated. The event may result in an alarm, an indication on an operator interface, an entry in a log, etc.

In order to have the system generate useful alarms and to avoid generation of false positives the systems generally is configured to only generate an event in the cases when the object crossing the logic line in the scene is of a type that is interesting. In some applications the interesting type of objects is humans, in other applications it is elephants, in yet other applications it is dogs. The interesting types of objects may even be products in a process, e.g. objects transported on a conveyer belt that are not to bounce of the conveyer belt. One problem with a simple tripwire implementation which may result in false positives is that the event is generated as soon as a detected object crosses the line independent of whether the detected object is a mouse, a human, or a truck. This problem has been solved in some known implementations by making the system generate an event only when the detected object is of a particular size or within a particular range of sizes.

In "Cisco Video Analytics User Guide", 2011, Text Part Number: OL-24428-01, from Cisco Systems Inc., 170 West Tasman Drive, San Jose, Calif. 95134-1706, USA, a system implementing a minimum size filter and a maximum size filter for eliminating objects that are smaller than a specified size and eliminating objects that are larger than a specified size from the general video analytics process. The maximum filter is set in a snapshot of the scene. Two boxes, one for the foreground and one for the background, are presented in the snapshot of the scene. The user is then to change the size of each of the boxes in order to indicate the maximum size of objects in the foreground and in the background, respectively. The same procedure is then performed for the minimum size filter, i.e. boxes are presented and the sizes of the boxes are adjusted. The document further describes two examples in which the maximum size filter and the minimum size filter, respectively, may be used. For example, a shadow from a tree or a tree branch may be mis-classified as a person. This may results in false alarms if the wind blows in the tree and its shadow crosses a video tripwire. In such a case the maximum object filter may be defined to provide the system with enough information to disregard excessively large objects that cross the video tripwire. In another example a small animal such as a squirrel may be misclassified and trigger a false alarm when crossing a video tripwire. This situation may then be solved using a minimum object size filter which makes the system disregard small objects that cross the video tripwire.

Hence, the above implementation solves the problem of false positives resulting from objects having a size distinguishable from the size of the objects that are to be detected. However, the act of setting the filters is quite cumbersome and adjusting the settings for the filters is not easier.

SUMMARY

One object of the present disclosure is to provide improved detection of objects crossing predetermined lines in a scene captured by means of a motion video camera. An additional object is to decrease the number of false positives resulting from objects having a size distinguishable from the size of the objects that are to be detected.

According to a first aspect, these and other objects are achieved, in full or at least in part by a method for detecting an object crossing event at a predetermined first line in a scene captured by means of a motion video camera. The method comprises determining from images of the scene captured by the motion video camera if an object image crosses the predetermined first line, calculating a size value relating to the size of the object image crossing the predetermined first line, setting a line distance value to a value calculated from the distance between a contact point of the object with the predetermined first line and a nearby point on a predetermined second line, and generating an object crossing event signal if a relation between the calculated size value and the line distance is within a predetermined range. The advantage of relating the size of the object image to a reference in the scene at the position of the object image is that it is possible to determine a relation between the size of the object image in the captured scene and the real size of the corresponding real world object. Thereby, it is possible to determine if the real world size of the object is within a specific size range independently of where along the detection line the object image size is calculated and, thus, making it possible to reduce the risk of generating false positives from objects that are of a size that are not of interest. This is possible due to the possibility to provide a reference that scales with the depth of the captured image, i.e. the reference is smaller at greater distance from the camera, which corresponds to the behaviour of an object positioned at different distances from the camera. Moreover, by introducing two lines and making the distance between the two lines at the position of the object crossing the line being the reference makes the process of setting up rules for line crossing more simple and the results less prone to false positives.

The size of the object may be related to the size of the area occupied by the object in the captured image. Further, the size of the area related to the size of the object may be calculated from the number of image elements the object occupies in the captured image.

In some embodiments the determining if an object crosses the predetermined first line may include detecting in images captured of the scene if an image element representing the object is positioned on an image element included in the predetermined first line. According to some embodiments the predetermined first line and the predetermined second line are virtual lines, wherein each line is defined by at least two coordinates representing positions within the scene. The first and second predetermined lines may be defined in the scene so that they are closer to each other at image elements in the scene representing positions further away from the camera. By having the lines be defined in this fashion it will be easy for the user setting up the event rules relating to crossing a line in that various reference values at different distances from the camera may easily approximated by the person by simply making the lines approximate the perspective properties of the scene. For many persons it is easy and natural to draw two lines in perspective in the captured scene of a camera emulating the perspective view of two parallel lines in the real world. In general, a typical scene would contain several object references that could be used to verify the accuracy of the distance between the two lines. Admittedly, these object references are rarely a pair of railroad tracks, but trees, poles, portions of a fence, a window, grass etc. all readily processed by the complex image analysis available in the human mind. This makes the present method surprisingly robust.

The determining of a line distance may include calculating a position along the predetermined second line having the shortest distance to the contact point of the object with the predetermined first line. The advantage of accessing a reference value in this way is that it is an easy method for getting a reference value from the more or less continuously adapting reference value introduced by the two lines.

Moreover, the predetermined first line and the predetermined second line may be a detection line pair and a plurality of detection line pairs may be defined for a scene. In this way it is possible to define events for crossing of more than one line or limit in the scene. It will also facilitate the generation of cross line events for complex lines in the scene.

In some embodiments the object crossing event signal is generated when the relation between calculated size of the object and the line distance squared is within the predetermined range. Moreover, the object crossing event signal may be generated as soon as the relation $$L_d^2 k \leq A_o \leq L_d^2 K$$

is valid, wherein $L_d$ is a value of the line distance determined in the process, $A_o$ is a value of the object area determined in the process, k is a predetermined lower limit constant, and K is a predetermined upper limit constant.

According to another aspect a system for detecting objects crossing predetermined lines in a captured scene may be configured to perform the various methods presented above. The advantages for features in such a system will coincide with the advantages for the corresponding feature in the method.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description. Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings wherein.

Further, in the figures like reference characters designate like or corresponding parts throughout the several figures.

DETAILED DESCRIPTION OF THE PREFERRED EMBODIMENTS

As described above, the present disclosure is related to perimeter surveillance and/or surveillance in areas where a line or a plurality of connected lines defines a boundary or a limit that is prohibited to pass by a person, an animal, or any other object as discussed above. In this text the detection of an object crossing a predetermined line or limit may be referred to tripwire, tripwire detection, perimeter crossing detection, line crossing detection. These terms are all representing the same function of detecting or reacting to the event of an object crossing a predetermined line in the scene.

Figure 1:
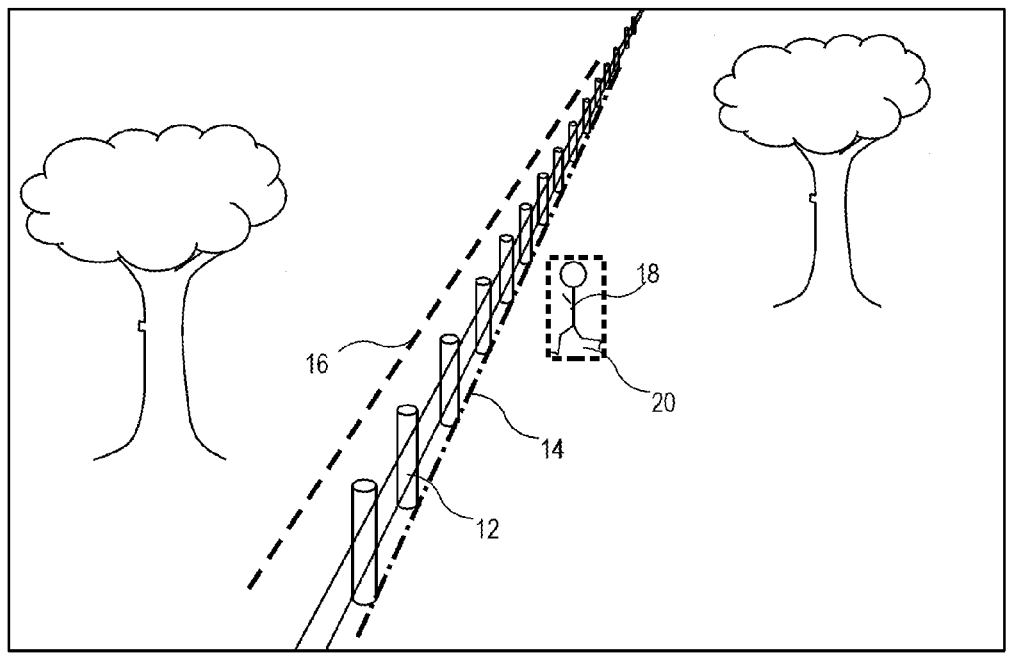
FIG. 1 is a schematic image representing a scene including a natural access limit, i.e. the fence, in which image an overlay of a detection line pair and an object detection box has been inserted.

Now referring to FIG. 1, in which an example of a surveyed scene 10 as captured by a motion video camera is shown. In the scene there is a physical perimeter in the form of a fence 12. In the present example we assume that the fence 12 is a perimeter not to be passed by persons. In order to facilitate detection of a person passing the perimeter the physical perimeter 12 is represented by a pair of logical lines 14, 16, in the system performing the detection. The system performing the detection may be the motion video camera capturing the imagery of the scene or another device connected to the camera and having the capability to process image data from the captured scene. The two logical lines 14, 16, may be defined by a user. A plurality of methods for defining logical lines on a display and/or in a digital representation of a scene is known to the skilled person. For example may the user select a point at respective end of the intended logical line and let the line be defined as a line extending from one point to the other. The two lines are drawn in "perspective", i.e. the distance between the two lines should reflect the depth in the scene. This may be achieved by the user looking at the displayed captured scene and visualising a fixed distance between the lines at various depths in the scene, which will result in two lines converging towards a point on a horizontal line, which horizontal line may or may not be visible. In this way the user will input an approximate reference for determining the real size of objects at various depths in the capture scene along the defined perimeter.

The system performing the detection also includes an object detection functionality for detecting objects in particular moving objects in the scene. Further, the system is arranged to determine or approximate an area Ao of an object image 18, wherein the object image 18 is the representation of the real world object as captured by a motion video camera. The object detection and the determination or approximation of the object image area Ao may be performed using any known process, algorithm or numerical method. The area may for instance be calculated by approximating a rectangle 20 or a polygon to the detected object image 18 and then count the number of image elements inside the rectangle 20 or the polygon. An image element may be an image block or it may be a pixel.

In embodiments of the disclosure a detected object is determined to be an object of interest based on the determined area of the detected object image 18 and the distance between the two lines 14, 16, at a location along the lines where the object image 18 is detected to cross the line. The relation between the area of an object image 18 and the distance between the two lines 14, 16, will then be possible to use to make the detection system correctly address objects within a particular real life size range even if objects at a further distance from the camera will be captured as a smaller area on the image sensor than an the same size object closer to the camera. This is achieved by the lines 14, 16, being arranged so that the distance between the lines 14, 16 becomes smaller the further away from the camera the position represented along the perimeter 12 is found. Hence, the distance between the two lines 14, 16 may be used as a size reference in order enable the system to determine if the real size of a detected object image 18 is within a predetermined range.

Figure 2:
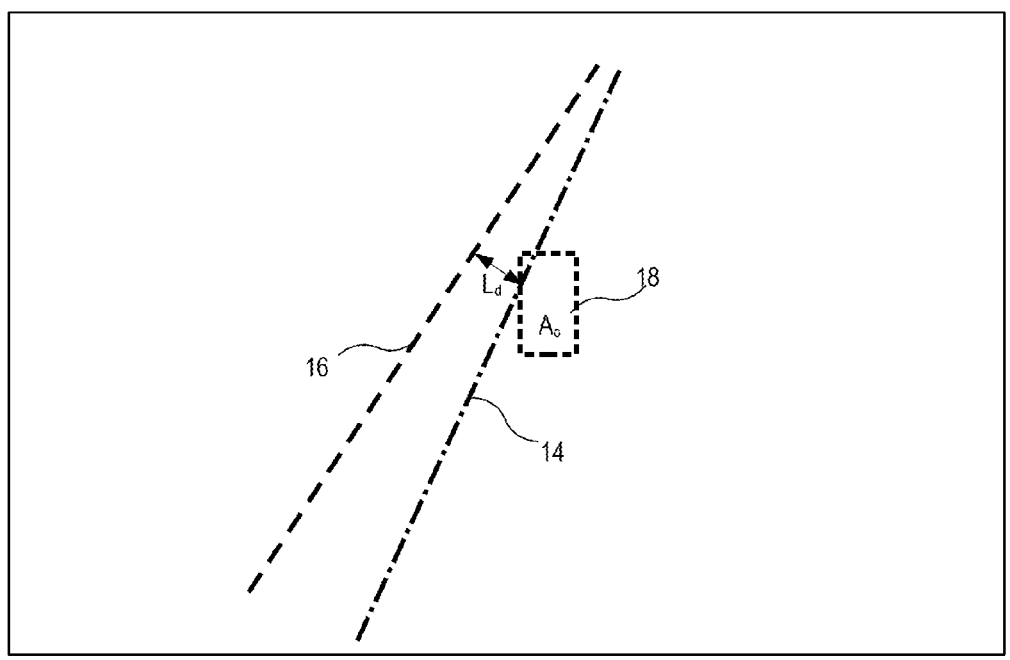
FIG. 2 is a schematic image presenting the detection line pair and the object detection box of FIG. 1 and illustrates the parameters operated on according to a methods according to some embodiments.
Figure 3:
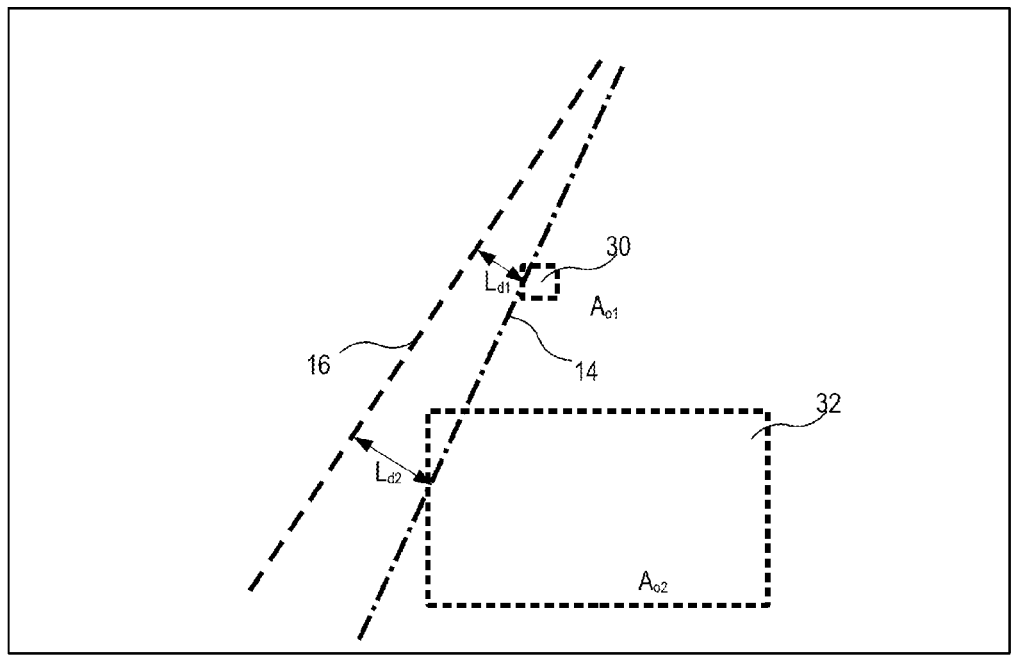
FIG. 3 is a schematic image presenting the detection line pair of FIG. 1 and two examples of objects having sizes larger than and smaller than an event generating size.

In FIG. 2 the parameters considered in determining a tripwire event according to some embodiments are showed. As mentioned previously the distance Ld between the lines 14, 16, at the position where the detected object image 18 is crossing one of the lines 14, 16, is determined. This distance Ld may be determined by calculating the shortest distance between the lines 14, 16 at the crossing. Further, the area $A_o$ of the object image 18 detected as crossing the line 14 is determined. This area $A_o$ may be determined by generating a logical box surrounding the object and then calculate the number of pixels in the box. Another alternative is to calculate the area based on the pixels occupied by the detected object image 18. The skilled person is well aware of plenty of methods for calculating the area of a specific area in a digital image. In order to determine if the object image 18 crossing should generate a tripwire event a relation between the distance $L_d$ and the area $A_o$ of the object image is observed. This observation is to be implemented in order to avoid generating a tripwire event for objects evidently not of interest, e.g. a rabbit crossing the perimeter 12, a shadow from a cloud crossing the perimeter 12, etc. FIG. 3 is illustrating areas representing a very small object $A_{o1}$ and a very large object $A_{o2}$ which both should be outside the range of object sizes that are to generate a tripwire event. Moreover, as seen in this figure the two object images 30, 32, are related to different distances between the lines 14, 16. The object image 30 having the area $A_{o1}$ is related to $L_{d1}$ which is a distance between the lines 14, 16, at the position of the object image 30 is crossing one of the lines and the object image 32 having the area $A_{o2}$ is related to $L_{d2}$ which is a distance between the lines 14, 16, at the position of object image 32 crossing one of the lines 14, 16.

In some embodiments the relation between the distance $L_d$ between the lines 14,16, at the position of the detected object image 18 crossing a line 14,16, and the area of the detected object image 18 may be determined by calculating a lower detection limit for the area of the object image 18 based on the line distance $L_d$ at the position of the object image crossing the line 14,16, and a higher detection limit for the area of the object based on the same line distance, i.e. calculating range of areas that should trigger a tripwire event at the particular position. The lower detection limit may be calculated as the line distance $L_d$ squared times a lower detection limit coefficient k:

$$L_d^2 k$$

The higher detection limit may be calculated as the line distance $L_d$ squared times a higher detection limit coefficient K:

$$L_d^2 K$$

Accordingly, the size of an area of a detected object that will trigger a tripwire event may be expressed as follows:

$$L_d^2 k \leq A_o \leq L_d^2 K$$

The value of the lower limit coefficient k and the value of the higher limit coefficient K is, according to some embodiments, pre-set and adjustable. The values of these coefficients may vary depending on the focal length of the lenses used in the camera. They may also vary on zoom levels, if applicable to the optical system of the camera. However, if the lines 14,16, are set at approximately one meter apart and the tripwire event is supposed to be triggered by a human sized object an initial value for these coefficients may be k=⅕ and K=5. These coefficient values allow for quite a large margin of error, i.e. may generate some unwanted false positives, but may be a perfect starting point at system set-up from which adjustments may be readily made. These coefficients are also a good starting point when an object detection algorithm used tends to provide an object image area that is quite a bit larger than the object image. In implementations having a more precise area estimation algorithm for a detected object image the coefficients may advantageously be set to k=0.75 and K=1.25.

Moreover, the tripwire detection in a setup as described in connection with FIGS. 1-3 may be configured to generate the tripwire event when any one of the lines 14, 16, is broken by an object image 18 having a size within the defined range. However, alternatively only one of the lines 14, 16, may be arranged to detect an object crossing or in yet another alternative an additional line may be arranged on the perimeter itself while two lines corresponding to lines 14 and 16 are arranged in order to provide the input for calculating the relative size of objects relating to the distance from the camera. In further embodiments the system of two detection lines 14,16, may be instructed to generate the tripwire event when an object have crossed a first one of the detection lines 14,16, and is breaking the second detection line 14,16. This implementation is advantageous in that a false event generation may be avoided for a situation in which an object is moving up to the detection line so that some part of the object image 18 is overlaid on the detection line 14, 16, in the captured scene without any part of the object crossing the line in the real world.

Figure 4:
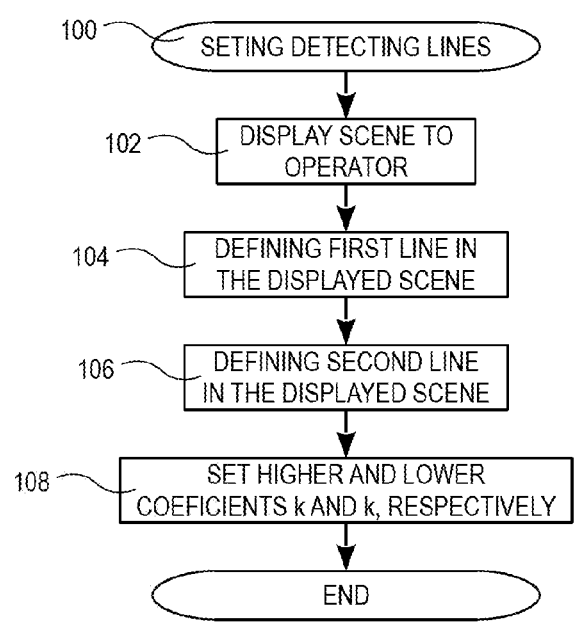
FIG. 4 is a flowchart of a process for setting up detection lines in a scene.

Now, referring to the flowchart in FIG. 4, showing a method for the user to set the tripwire detection lines, process 100, according to some embodiments of the disclosure. First a digital image of the scene for which the tripwire detection is to be set up, step 102, is displayed for the operator setting the detection lines. The digital image may be a still image of the scene, it may be a recorded motion video, or it may be a live motion video stream. Then the user starts by defining the first detection line 14 by indicating a first point and a second point in the scene, step 104. The line is then defined as a line between these two points. Then the user defines the second detection line 16 by indicating a third point and a fourth point in the scene, step 106. The two lines 14, 16, are, as mentioned above arranged at a closer distance from each other in positions of the scene that is further away from the camera than areas in which the lines are arranged at a greater distance from each other. When, the lines are set the user may be presented with an opportunity to adjust the values of the higher and lower limit coefficients k and K, step 108. When the lines 14, 16, are defined the system is set up for detection of objects of sizes relevant in for the application in the specific case.

Figure 5:
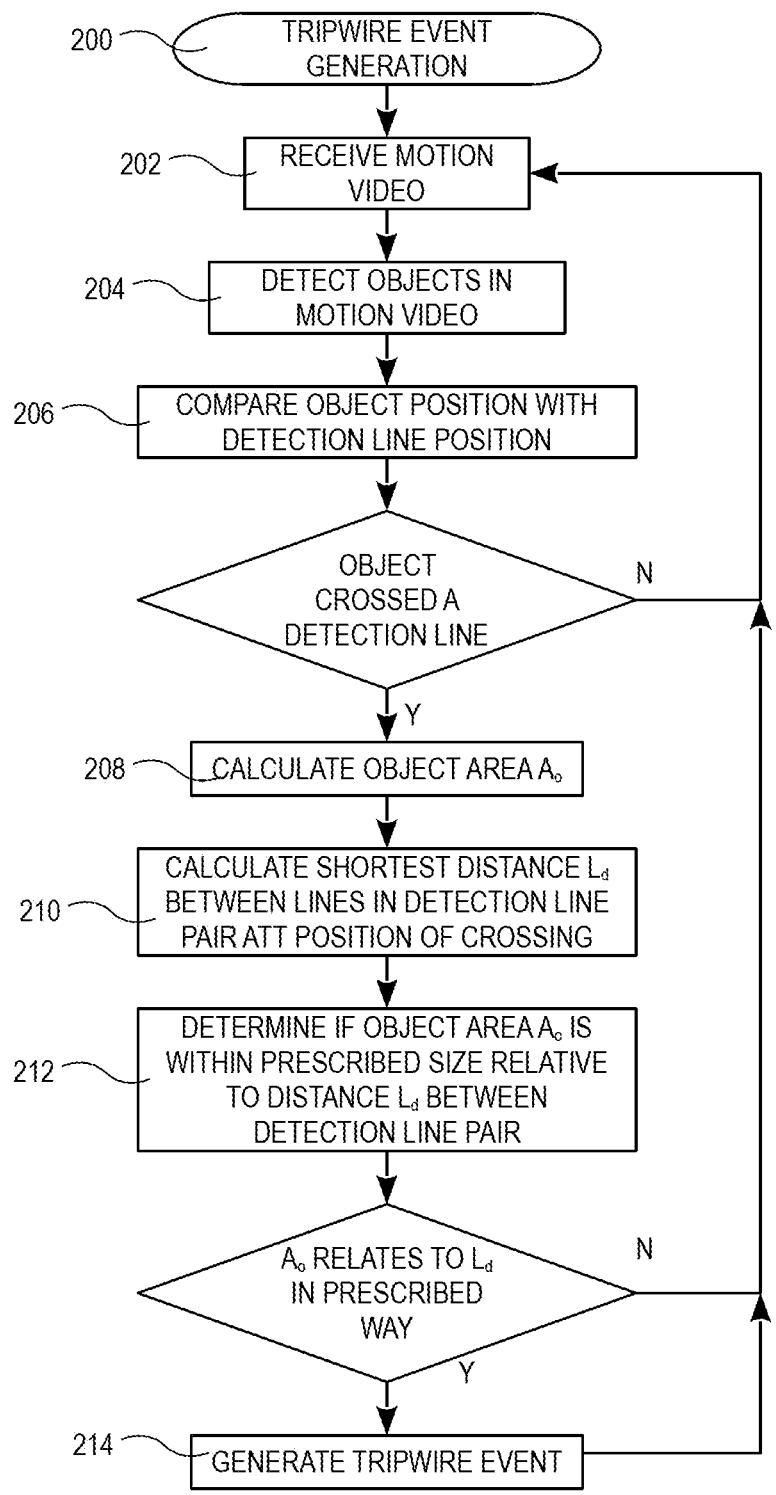
FIG. 5 is a flowchart of a method for detecting an object crossing event at a predetermined first line in a scene captured by means of a motion video camera.

In the flowchart of FIG. 5 the process for tripwire event generation, 200, is presented. The process includes receiving motion video, step 202, and detecting objects images in the motion video, step 204. The position of the object image 18 is then compared to positions occupied by at least one of the detection lines 14, 16, step 206. If a detected object image 18 crosses one of the detection lines 14, 16, then the process continue to step 208. If a detected object image 18 does not cross one of the detection lines 14, 16, then the process returns and receives further motion video and continues to detect object images.

There are various ways to define what criteria the system is to interpret as a crossing of a line. One way to implement the system is to have it detect a crossing of the line when a box drawn around the object image touches the line. Another is to detect a crossing as soon as a pixel or a couple of pixels of the detected object image touches the line. Yet another way is to detect a crossing of the line when a predetermined amount of the object image has crossed the line or when the entire object image has crossed the line and is moving away from it on the other side. Moreover, as mentioned above, the lines used in detecting may vary depending on the implementation.

When, an object image 18 is detected as crossing the line 14, 16, then the area $A_o$ of the object image 18 is calculated, step 208. The area $A_o$ may also be determined in different ways which have been described previously. Then, in order to decide whether the object detection relates to a relevant object, the shortest distance between the detection lines 14, 16 in a detection line pair at the position of the line crossing is calculated, step 210. Other schemes for arriving at a distance between the two lines 14, 16, at the location of the object crossing one of the lines may be implemented as discussed earlier. The area of the object $A_o$ and the distance between the lines at the crossing of one of the lines Ld is then used to determine if the area $A_o$ of the object image 18 is within a prescribed range at the distance from the camera indicated by the distance between the two lines 14, 16, at that distance, step 212, e.g. by comparing the line distance squared $L_d^2$ with the object area $A_o$ as described previously. If the relationship between the line distance $L_d$ and the area $A_o$ of the object image 18 crossing the line 14, 16, is indicating that the real world object is of a size that is interesting for the present monitoring scheme then a tripwire event is generated, step 214, and the tripwire event is presented to a user or users on an alarm signalling device or on a display in a monitoring client. If the area $A_o$ of the object crossing the line 14, 16, is determined to be of a value that is smaller or larger than the objects of interest then the process returns to step 202 and continues monitoring the tripwires without generating a tripwire event.

Figure 6:
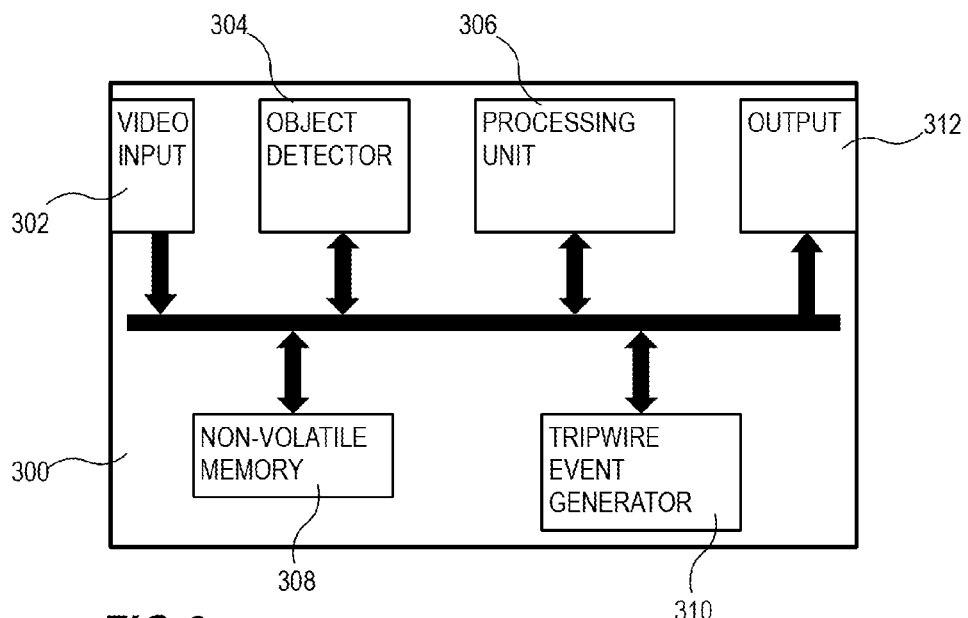
FIG. 6 is a schematic block diagram over a line crossing detection device according to some embodiments.

Now referring to FIG. 6, an example of a line crossing detection device 300 according to some embodiments of the disclosure. This line crossing detection device includes a video input device 302, an object image detector 304, a processing unit 306, a non-volatile memory 308, a tripwire event generator 310, an output 312 for output of data including the event. The line crossing detection device 300 may be a general purpose computer, a networked video encoder arranged to encode analog video to digital video and send the resulting video to clients via a computer network, or a device built for the purpose of detecting line crossings in motion video. The video input 302 is a port configured to receive motion video, e.g. analog video or network traffic including digital video. The object detector 304 is configured to detect objects in the received motion video.

The object image detector 304 may be implemented using electronic circuitry, logic gates etc. The object image detector 304 may also be implemented by means of program code that is executed in a processing device, which could be a separate processing device or the processing unit 306. The function of the object image detector 304 is to identify object images in the received motion video and the skilled person is well aware of a plurality of different possible implementations for achieving such functionality.

The processing unit 306 may be any type of general purpose processor, e.g. a microprocessor, a CPU, etc., that is enable to execute program code stored in a memory. In the example line crossing detection device 300 the processing unit 306 is running code relating to the detection of an object image 18 crossing at least one of the lines 14, 16, in the detection line pair 14, 16, relating to calculating the area of an object image, calculating the relation between line distance Ld and object image area Ao, and based on these operations send an instruction for generation of a tripwire event. In some embodiments all the functions described in relation to FIG. 5 is performed by means of executing code in a corresponding processing unit. The non-volatile memory 308 may store information such as the program code that is to be executed by the processing unit 306. Further, the non-volatile memory 308 may also store data defining detection lines 14, 16, that are to be used in the line crossing detection and the coefficients k, K, used for the same purpose.

The tripwire event generator 310 is arranged to generate the tripwire event that is to alert a user or an operator of the fact that a detection line 14, 16, has been crossed. The output 312 may be a network connection for sending the tripwire event to a client via a network. Alternatively, the output 312 may be a display output presenting an interface to the user or operator and in that case the trip wire event generator 310 may generate a graphic overlay and or a sound to be presented.

Figure 7:
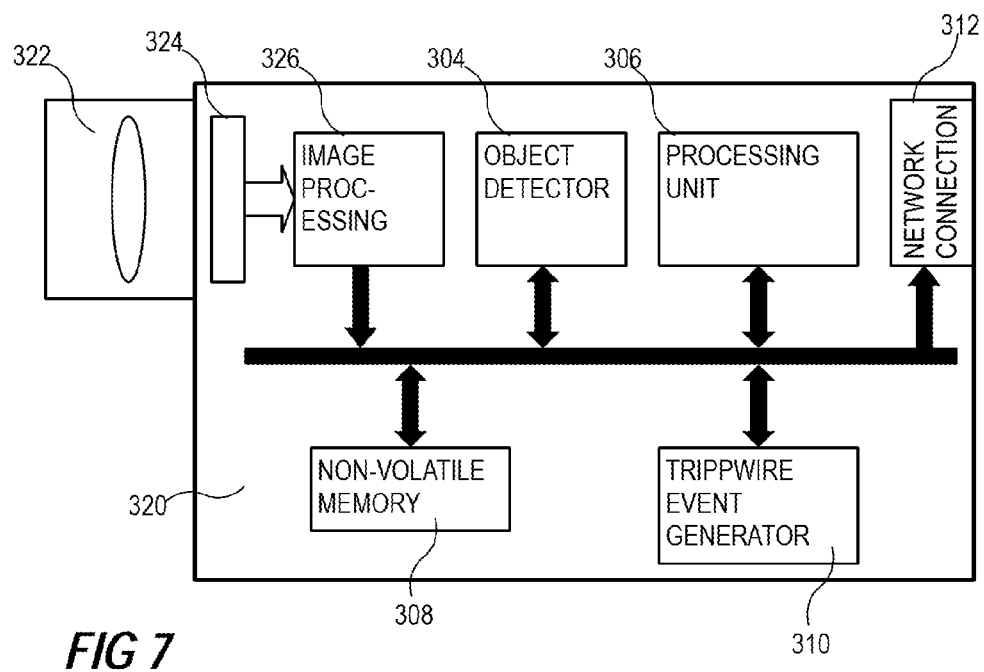
FIG. 7 is a schematic block diagram over a line crossing detection device in a motion video camera according to some embodiments.

In other embodiments a line crossing detection device is implemented within a networked motion video camera 320. An example of such an embodiment is showed in FIG. 7. Features in FIG. 7 having the same reference number as a feature from FIG. 6 are to be understood as being described in connection with FIG. 6 and will thus not be described in the description of FIG. 7. The main difference in features are that the output device 312 in the networked motion video camera 320 is a device arranged to provide network connection, which also was an alternative for the line crossing detection device 300. Moreover, the video input 302 is replaced by a lens 322, an image sensor 324, and an image processor 326. These features are all well known to a person skilled in the art and will therefore not be described in more detail herein.

Figure 8:
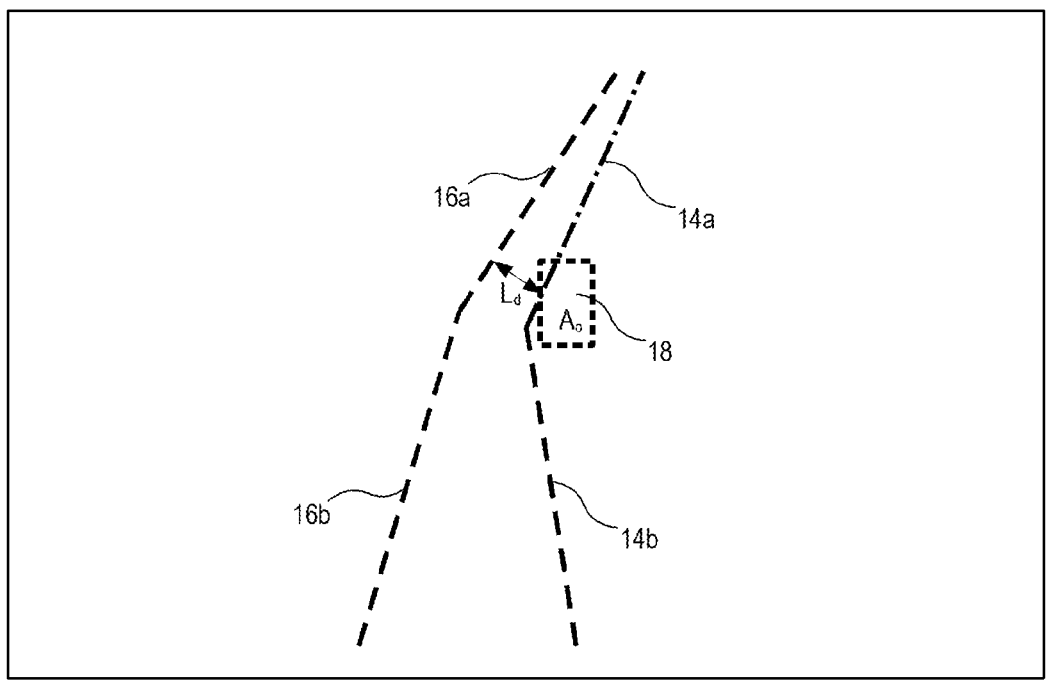
FIG. 8 is a schematic image showing a plurality of detection line pairs.

According to some embodiments of the disclosure the line detection process may be implemented to detect line crossing for a plurality of lines. In FIG. 8 an example of this is shown. The figure shows two different detection line pairs, 14a, 16a, and 14b and 16b. The line detection operation will operate in the same manner as for one line detection pair with the difference that the process would have to check each detection line pair separately, i.e. a testing for if an object image 18 has crossed a line is performed for each detection line pair 14a, 16a, 14b, 16b, individually. Then the above described process, which is described for a single detection line pair, is applicable to the multiple detection line pair as well by processing each detecting line pair 14a, 16a, 14b, 16b, in the same way as has been described for the single detection line pair case previously in this description. The skilled person appreciates that the number of detection line pairs may be higher than two. One thing that limits the number of detection line pairs may be the resolution of the captured motion video and the number or detection line pairs that may be fitted within one scene. Further, the number of detection line pairs may also be restricted by the processing power of the device implementing the detection process.

According to some embodiments the motion video processed for detection of line crossing may be a motion video made from captured infrared radiation, i.e. an infrared motion video. In case of the process being implemented in a motion video camera the motion video camera includes an infrared image sensor enabled to capture infrared radiation.

What is claimed is:

1. A method for detecting an object crossing event at a predetermined first line in a scene captured by a motion video camera, the method comprising:
   determining from images of the scene captured by the motion video camera if an object image crosses the predetermined first line;
   calculating a size value relating to the size of the object image crossing the predetermined first line;
   setting a line distance value to a value calculated from the shortest distance between a contact point of the object with the predetermined first line and a predetermined second line; and
   generating an object crossing event signal if a relation between the calculated size value and the line distance is within a predetermined range.

2. The method according to claim 1, wherein the size value relating to the size of the object image is related to the size of an area occupied by the object in the captured image.

3. The method according to claim 2, wherein the size of the area related to the size of the object image is calculated from a number of image elements the object image occupies in the captured image.

4. The method according to claim 1, wherein the determining if an object crosses the predetermined first line includes detecting in images captured of the scene if image element representing the object is positioned on an image element included in the predetermined first line.

5. The method according to claim 1, wherein the predetermined first line and the predetermined second line are virtual lines, wherein each line is defined by at least two coordinates representing positions within the scene.

6. The method according to claim 1, wherein the first and second predetermined lines are defined in the scene so that they are closer to each other at image elements in the scene representing positions further away from the motion video camera.

7. The method according to claim 1, wherein the setting a line distance value includes calculating a position along the predetermined second line having the shortest distance to the contact point of the object image with the predetermined first line.

8. The method according to claim 1, wherein the predetermined first line and the predetermined second line is a detection line pair and a plurality of detection line pairs may be defined for a scene.

9. The method according to claim 1, wherein the object crossing event signal is generated when the relation between calculated size value and the line distance squared is within the predetermined range.

10. The method according to claim 1, wherein the object crossing event signal is generated as soon as a relation $$L_d^2 k \leq A_o \leq L_d^2 K$$

is valid, wherein $L_d$ is a value of the line distance, $A_o$ is a value of an area related to the size of the object, k is a predetermined lower limit constant, and K is a predetermined upper limit constant.

11. A system for detecting objects crossing predetermined lines in a captured scene, the system comprising:
   a monitoring camera configured to capture images of a scene;
   a processing unit configured to:
      determine from images of the captured scene if an object image crosses a predetermined first line;
      calculate a size value relating to the size of the object image crossing the predetermined first line;
      setting a line distance value to a value calculated from the shortest distance between a contact point of the object with the predetermined first line and a predetermined second line; and
      generate an object crossing event signal if a relation between the calculated size value and the line distance is within a predetermined range.

* * * * *